United States Patent
Liao

(10) Patent No.: US 12,510,277 B2
(45) Date of Patent: Dec. 30, 2025

(54) CONTROL METHOD AND CONTROL DEVICE FOR ELECTRONIC EXPANSION VALVE AND AIR SOURCE HEAT PUMP SYSTEM

(71) Applicant: Guangdong Carrier HVAC Co., Ltd., Foshan (CN)

(72) Inventor: Zhenhua Liao, Guangdong (CN)

(73) Assignee: GUANGDONG CARRIER HVAC CO., LTD., Foshan (CN)

( * ) Notice: Subject to any disclaimer, the term of this patent is extended or adjusted under 35 U.S.C. 154(b) by 364 days.

(21) Appl. No.: 18/180,985

(22) Filed: Mar. 9, 2023

(65) Prior Publication Data

US 2023/0288114 A1 Sep. 14, 2023

(30) Foreign Application Priority Data

Mar. 9, 2022 (CN) .......................... 202210226437.1

(51) Int. Cl.
F25B 49/02 (2006.01)
F25B 30/02 (2006.01)
F25B 41/34 (2021.01)

(52) U.S. Cl.
CPC ............ *F25B 49/022* (2013.01); *F25B 30/02* (2013.01); *F25B 41/34* (2021.01); *F25B 2600/2513* (2013.01)

(58) Field of Classification Search
CPC ........ F25B 49/022; F25B 41/34; F25B 30/02; F25B 2600/2513
See application file for complete search history.

(56) References Cited

FOREIGN PATENT DOCUMENTS

| CN | 110595020 A | 12/2019 |
|---|---|---|
| CN | 112013474 A | 12/2019 |
| CN | 112066511 A | 12/2020 |

OTHER PUBLICATIONS

European Search Report for Application No. 23161070.0, Issued Aug. 8, 2023, 8 Pages.

*Primary Examiner* — Nael N Babaa
(74) *Attorney, Agent, or Firm* — CANTOR COLBURN LLP

(57) ABSTRACT

A control method and control device for an electronic expansion valve and an air source heat pump system. The control method includes obtaining a frequency of a compressor, calculating a target exhaust gas temperature according to the frequency, and controlling an opening degree of the electronic expansion valve according to the target exhaust gas temperature; and obtaining an exhaust gas superheat degree of the compressor, and correcting the opening degree of the electronic expansion valve according to a comparison result between the exhaust gas superheat degree and a preset superheat degree value, so that the exhaust gas superheat degree meets superheat degree requirements.

8 Claims, 2 Drawing Sheets

CONTROL METHOD AND CONTROL DEVICE FOR ELECTRONIC EXPANSION VALVE AND AIR SOURCE HEAT PUMP SYSTEM

FOREIGN PRIORITY

This application claims priority to Chinese Patent Application No. 202210226437.1, filed Mar. 9, 2022, and all the benefits accruing therefrom under 35 U.S.C. § 119, the contents of which in its entirety are herein incorporated by reference.

TECHNICAL FIELD OF INVENTION

The present invention relates to the technical field of heat pump control, and particularly relates to a control method and control device for an electronic expansion valve and an air source heat pump system.

BACKGROUND OF THE INVENTION

With the increasing requirements for energy saving and environmental protection, the admission level of energy efficiency and the demands of consumers are also gradually increasing, therefore, the market for high-energy-efficiency household appliances is also increasing. High-energy-efficiency household appliances achieve throttling usually by using expansion valves, for example, the electronic expansion valves can improve the capacity and energy efficiency of the household appliances under low loads by changing the rates of flow, therefore, the effective control on opening degrees of the electronic expansion valves is an important factor to achieve high energy efficiency.

In the prior art, when an electronic expansion valve is controlled by target exhaust gas, if the system has insufficient refrigerants and is running in a low-temperature heating mode, an opening degree of the electronic expansion valve, controlled according to a target exhaust gas temperature, will be smaller and smaller, which results in that the amount of refrigerant circulation of the system is insufficient, as a result, under certain extreme working conditions, the sufficient exhaust gas superheat degree cannot be guaranteed; when an electronic expansion valve is controlled by a target opening degree, the sufficient exhaust gas superheat degree cannot be guaranteed in certain low-frequency ranges; and in some cases, a certain sensor of the system will also bring negative influences due to a temperature drift of low temperature environments, so that the accuracy of normal control at normal temperature cannot be guaranteed. In addition, the poor adjustment of the opening degree of the electronic expansion valve may also cause that liquid return occurs in units and the reliability of the system cannot be ensured.

SUMMARY OF THE INVENTION

In view of the above problems, the present invention provides a control method and control device for an electronic expansion valve of an air source heat pump system, by which a sufficient exhaust gas superheat degree still can be ensured even under extreme working conditions or in low frequency ranges, thereby improving the operation stability and reliability of the air source heat pump system.

The present invention provides a control method for an electronic expansion valve of an air source heat pump system, which includes: obtaining a frequency of a compressor, calculating a target exhaust gas temperature according to the frequency, and controlling an opening degree of the electronic expansion valve according to the target exhaust gas temperature; and obtaining an exhaust gas superheat degree of the compressor, and correcting the opening degree of the electronic expansion valve according to a comparison result between the exhaust gas superheat degree and a preset superheat degree value, so that the exhaust gas superheat degree meets superheat degree requirements.

According to the present invention, the target exhaust gas temperature is calculated according to the frequency of the compressor, so that the operation load and state of the system can be visually reflected and will not be affected by low-temperature environments, thus, the control accuracy of the electronic expansion valve can be guaranteed, a problem that a detected temperature value is inaccurate due to a fact that a resistance value of an exhaust gas temperature probe is influenced by the low-temperature environment in the prior art and a negative influence caused by temperature drifts are overcome. The opening degree of the electronic expansion valve is corrected according to the comparison result between the exhaust gas superheat degree and the preset superheat degree value, so that the superheat degree requirements can be met no matter the compressor operates at a high frequency or a low frequency, and the control accuracy of the electronic expansion valve is further improved, thereby improving the operation reliability of the system.

In an optional technical solution of the present invention, in the rising process of the exhaust gas superheat degree, the opening degree of the electronic expansion valve is controlled to be reduced when the exhaust gas superheat degree is less than a first preset value, the opening degree of the electronic expansion valve is maintained when the exhaust gas superheat degree is less than a second preset value and greater than the first preset value, and the opening degree of the electronic expansion valve is controlled according to the target exhaust gas temperature when the exhaust gas superheat degree is greater than the second preset value; and in the falling process of the exhaust gas superheat degree, the opening degree of the electronic expansion valve is controlled according to the target exhaust gas temperature when the exhaust gas superheat degree is greater than a third preset value, the opening degree of the electronic expansion valve is maintained when the exhaust gas superheat degree is less than the third preset value and greater than a fourth preset value, and the opening degree of the electronic expansion valve is controlled to be reduced when the exhaust gas superheat degree is less than the fourth preset value, where the fourth preset value, the first preset value, the third preset value and the second preset value are sequentially increased.

According to the technical solution, for different exhaust gas superheat degrees, the opening degree of the electronic expansion valve is controlled to be changed, which can satisfy both the requirements of the exhaust gas superheat degrees and the control accuracy of the electronic expansion valve.

In an optional technical solution of the present invention, in a refrigeration mode, the frequency of the compressor and an outdoor ambient temperature are obtained, the target exhaust gas temperature is calculated according to the outdoor ambient temperature and the frequency of compressor, and the target exhaust gas temperature=$A*F+T1+B$, where: A is a coefficient; F is the frequency of the compressor; T1 is the outdoor ambient temperature; and B is a constant.

According to the technical solution, in the refrigeration mode, the target exhaust gas temperature is calculated in combination with the outdoor ambient temperature and the frequency, which is beneficial to improving the accuracy of the target exhaust gas temperature, improving the control accuracy of the electronic expansion valve and the operating efficiency of the system, and meeting the needs of users.

In an optional technical solution of the present invention, the control method further includes: in the refrigeration mode, obtaining an exhaust gas temperature T2 of the compressor and a coil temperature T3 of an outdoor unit, and obtaining an exhaust gas superheat degree according to a difference between T2 and T3.

According to the technical solution, the exhaust gas superheat degree is calculated according to the difference between the exhaust gas temperature and the coil temperature, and compared with the preset superheat degree value, so that the control accuracy of the electronic expansion valve is improved.

In an optional technical solution of the present invention, the control method further includes: in a heating mode, obtaining the outdoor ambient temperature T1, and adjusting the opening degree of the electronic expansion valve according to a target opening degree of the electronic expansion valve when the outdoor ambient temperature T1 is not greater than a first preset temperature, where for different outdoor ambient temperatures, the corresponding target opening degrees are different; and when the outdoor ambient temperature is greater than the first preset temperature, controlling the opening degree of the electronic expansion valve according to the target exhaust gas temperature.

According to the technical solution, when the outdoor ambient temperature is less than a first preset temperature value, a resistance value of an exhaust gas temperature probe is influenced, which causes that a detected exhaust gas temperature is inaccurate; the application of the target opening degree to control the opening degree of the electronic expansion valve can ensure the control accuracy of the opening degree of the electronic expansion valve; and when the outdoor ambient temperature is greater than the first preset temperature, the operating load and state of a machine can be intuitively reflected by means of frequencies, thereby improving the control accuracy of the electronic expansion valve. According to different outdoor ambient temperatures, different control methods are adopted, which can take into account the advantages of target opening degree control and target exhaust gas temperature control, thereby improving the operation effect of the system.

In an optional technical solution of the present invention, the target opening=$y*F+z$; the outdoor ambient temperature is less than $a°$ C., $y=y1$, $z=z1$; the outdoor ambient temperature follows an equation $a<T1<b$, $y=y2$, $z=T4+z2$; and the outdoor ambient temperature follows an equation $b<T1<c$, $y=y3$, $z=T4+z3$; where a, b, and c are preset outdoor ambient temperature parameters, and y1, y2, y3, z1, z2, and z3 are coefficients respectively.

According to the technical solution, under different outdoor ambient temperature conditions, the corresponding target opening degrees are different, which improves the control accuracy of the electronic expansion valve.

In an optional technical solution of the present invention, in the rising process of the exhaust gas superheat degree, the opening degree of the electronic expansion valve is controlled to be reduced when the exhaust gas superheat degree is less than a first preset value, the opening degree of the electronic expansion valve is maintained when the exhaust gas superheat degree is less than a second preset value and greater than the first preset value, and the opening degree of the electronic expansion valve is controlled according to the target opening degree when the exhaust gas superheat degree is greater than the second preset value; and in the falling process of the exhaust gas superheat degree, the opening degree of the electronic expansion valve is controlled according to the target opening degree when the exhaust gas superheat degree is greater than a third preset value, the opening degree of the electronic expansion valve is maintained when the exhaust gas superheat degree is less than the third preset value and greater than a fourth preset value, and the opening degree of the electronic expansion valve is controlled to be reduced when the exhaust gas superheat degree is less than the fourth preset value, where the fourth preset value, the first preset value, the third preset value and the second preset value are sequentially increased.

According to the technical solution, for different exhaust gas superheat degrees, the opening degree of the electronic expansion valve is controlled to be changed, which can satisfy both the requirements of the exhaust gas superheat degrees and the control accuracy of the electronic expansion valve.

In an optional technical solution of the present invention, the frequency of the compressor and an outlet water temperature T4 of the heat pump are obtained, and the target exhaust gas temperature=$a*F+b*T4+d+c$, where: F is the frequency of the compressor; T4 is the outlet water temperature of the heat pump; a, b, and d are coefficients, respectively; and c: when $F≤nHz$, $c=1$; and when $F>nHz$, $c=0$, and n is a constant.

According to the technical solution, the target exhaust gas temperature is calculated through the outlet water temperature of the heat pump and the frequency of the compressor, which improves the accuracy of calculation of the target exhaust gas temperature, thereby improving the control accuracy of the electronic expansion valve.

The present invention further provides a control device for an electronic expansion valve of an air source heat pump system, which is characterized by including: an obtaining module, configured to obtain a frequency of a compressor and an exhaust gas superheat degree of the compressor; a processing module, configured to calculate a target exhaust gas temperature according to the frequency of the compressor; and a control module, configured to control an opening degree of the electronic expansion valve according to the target exhaust gas temperature, and correct the opening degree of the electronic expansion valve according to a comparison result between the exhaust gas superheat degree and a preset superheat degree value, so that the exhaust gas superheat degree meets superheat degree requirements.

The present invention further provides an air source heat pump system which implements the control method for an electronic expansion valve of an air source heat pump system, or includes the control device for an electronic expansion valve of an air source heat pump system.

DETAILED DESCRIPTION OF THE INVENTION

The following will clearly and completely describe the technical solutions in the embodiments of the present invention with reference to the accompanying drawings in the embodiments of the present invention. Apparently, the described embodiments are merely a part rather than all of the embodiments of the present invention. All other embodiments obtained by those of ordinary skill in the art on the basis of the embodiments of the present invention without creative efforts fall within the scope of protection of the present invention.

First Embodiment

Figure 1:
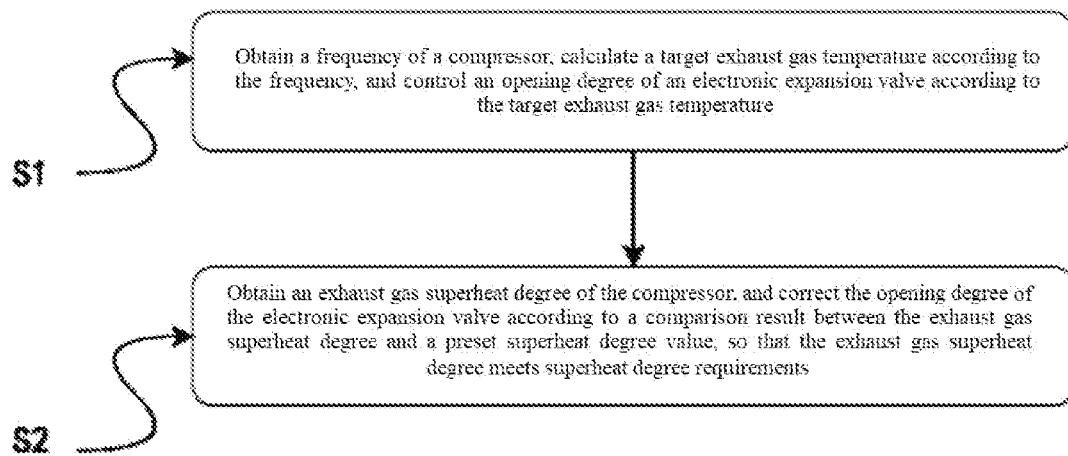
FIG. 1 is a schematic flowchart of a control method for an electronic expansion valve of an air source heat pump system in a first embodiment of the present invention.

As shown in FIG. 1, the present invention provides a control method for an electronic expansion valve of an air source heat pump system, which includes: obtaining a frequency of a compressor, calculating a target exhaust gas temperature according to the frequency, and controlling an opening degree of the electronic expansion valve according to the target exhaust gas temperature; and obtaining an exhaust gas superheat degree of the compressor, and correcting the opening degree of the electronic expansion valve according to a comparison result between the exhaust gas superheat degree and a preset superheat degree value, so that the exhaust gas superheat degree meets superheat degree requirements.

According to the present invention, the target exhaust gas temperature is calculated according to the frequency of the compressor, so that the operation load and state of the system can be visually reflected and will not be affected by low-temperature environments, thus, the control accuracy of the electronic expansion valve can be guaranteed, a problem that a detected temperature value is inaccurate due to a fact that a resistance value of an exhaust gas temperature probe is influenced by the low-temperature environment in the prior art and a negative influence caused by temperature drifts are overcome. The opening degree of the electronic expansion valve is corrected according to the comparison result between the exhaust gas superheat degree and the preset superheat degree value, so that the superheat degree requirements can be met no matter the compressor operates at a high frequency or a low frequency, and the control accuracy of the electronic expansion valve is further improved, thereby improving the operation reliability of the system.

Corresponding to the first embodiment of the present invention, the present invention further provides a control device for an electronic expansion valve of an air source heat pump system, which includes: an obtaining module, configured to obtain a frequency of a compressor and an exhaust gas superheat degree of the compressor; a processing module, configured to calculate a target exhaust gas temperature according to the frequency of the compressor; and a control module, configured to control an opening degree of the electronic expansion valve according to the target exhaust gas temperature, and correct the opening degree of the electronic expansion valve according to a comparison result between the exhaust gas superheat degree and a preset superheat degree value, so that the exhaust gas superheat degree meets superheat degree requirements.

Although the above-mentioned modules of the control device are shown in this embodiment of the present invention, the structural composition of the control device is not limited to the above-mentioned modules, for example, the control device further includes a storage module configured to store data such as the frequency of the compressor, the outdoor ambient temperature, the preset superheat degree value, a calculation formula of the target exhaust gas temperature, and a calculation formula of the target opening degree, and the like, thus, an effect that the electronic expansion valve implements different control solutions under different conditions is achieved, and under the premise of meeting the superheat degree requirements, the control accuracy of opening degrees of the electronic expansion valve is improved and the stable operation of the system is guaranteed.

Second Embodiment

The second embodiment of the present invention provides a control method for an electronic expansion valve of an air source heat pump system. The control method is a control method for an electronic expansion valve in a heating mode, which includes: obtaining a frequency of a compressor and an outdoor ambient temperature, calculating a first target exhaust gas temperature according to the outdoor ambient temperature and the frequency of the compressor, and correcting an opening degree of the electronic expansion valve according to a comparison result between the first exhaust gas superheat degree and a preset superheat degree value, so that the first exhaust gas superheat degree meets superheat degree requirements.

Specifically, after the electronic expansion valve of an outdoor unit operates at a first initial opening degree (the minimum opening degree is 90 steps) for a first predetermined period of time (e.g., 3 minutes), the opening degree of the electronic expansion valve is controlled according to the first target exhaust gas temperature. The first target exhaust gas temperature=$A*F+T1+B$, where: A is a coefficient; F is the frequency of the compressor; T1 is the outdoor ambient temperature; and B is a constant, a correction value, which can be adjusted according to different systems.

In a refrigeration mode, a target exhaust gas temperature is calculated in combination with the outdoor ambient temperature and the frequency, which is beneficial to improving the accuracy of the target exhaust gas temperature, improving the control accuracy of the electronic expansion valve and the operating efficiency of the system, and meeting the needs of users.

Further, the method also includes obtaining an exhaust gas temperature T2 of the compressor and a coil temperature T3 of the outdoor unit, and obtaining a first exhaust gas superheat degree SH1 according to a difference between T2 and T3.

Figure 2:
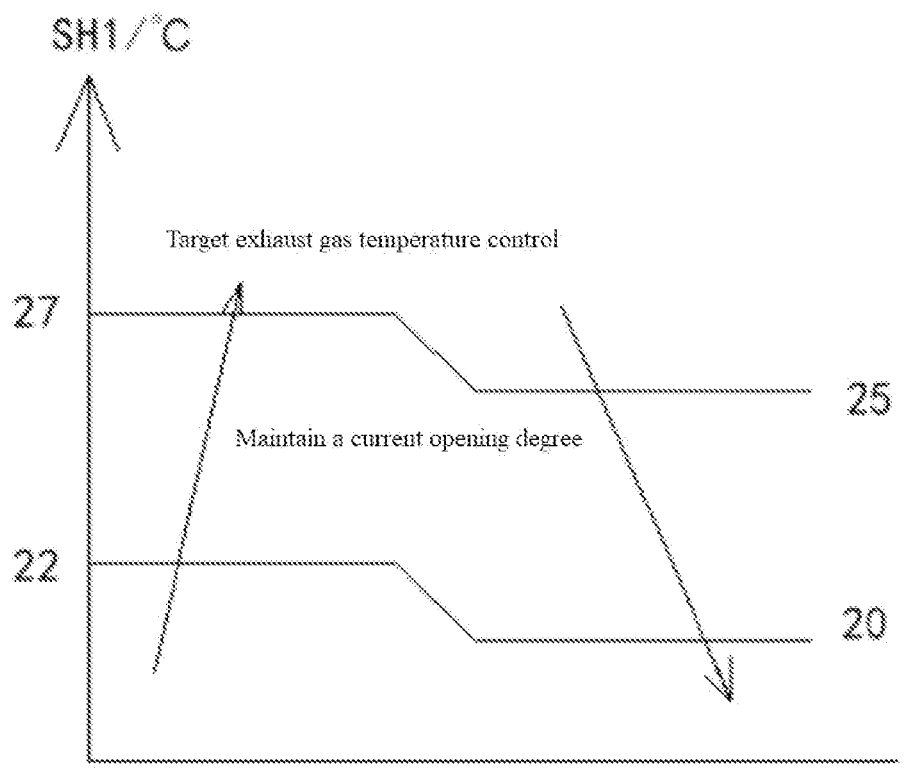
FIG. 2 is a line chart of adjusting an opening degree of an electronic expansion valve according to an exhaust gas superheat degree in a second embodiment of the present invention.

Specifically, as shown in FIG. 2, in the rising process of the first exhaust gas superheat degree, the opening degree of the electronic expansion valve is controlled to be reduced when the first exhaust gas superheat degree is less than a first preset value, the opening degree of the electronic expansion valve is maintained when the first exhaust gas superheat degree is less than a second preset value and greater than the first preset value, and the opening degree of the electronic expansion valve is controlled according to the target exhaust gas temperature when the first exhaust gas superheat degree is greater than the second preset value; and in the falling process of the first exhaust gas superheat degree, the opening degree of the electronic expansion valve is controlled according to the target exhaust gas temperature when the first exhaust gas superheat degree is greater than a third preset value, the opening degree of the electronic expansion valve is maintained when the first exhaust gas superheat degree is less than the third preset value and greater than a fourth preset value, and the opening degree of the electronic expansion valve is controlled to be reduced when the first exhaust gas superheat degree is less than the fourth preset value, where the fourth preset value, the first preset value, the third preset value and the second preset value are sequentially increased. Specifically, an adjustment rate of the electronic expansion valve is adjusted according to different systems or different outdoor ambient temperatures and superheat conditions, such as 30 seconds per step and 60 seconds per step, if the exhaust gas superheat degree is too large, the adjustment needs to be implemented faster, 30 seconds per step and the like will be selected, and if the exhaust gas superheat degree is close to a target value, the adjustment is implemented slowly, which is conducive to the stability of the system under the premise of ensuring the superheat degree. The adjustment rate of the electronic expansion valve is not limited in the present invention. According to the present invention, for different first exhaust gas superheat degrees, the opening degree of the electronic expansion valve is controlled to be changed, which can satisfy both the requirements of the exhaust gas superheat degree and the control accuracy of the electronic expansion valve. In the specific embodiment of the present invention, the fourth preset value, the first preset value, the third preset value and the second preset value are respectively 20, 22, 25, and 27. The superheat preset value can be adjusted by those skilled in the art according to the system, and is not limited to the examples of the present invention.

Third Embodiment

The third embodiment of the present invention provides a control method for an electronic expansion valve of an air source heat pump system. The third embodiment differs from the first embodiment in that in the second embodiment, the control method is a control method for an electronic expansion valve in a heating mode, when an outdoor ambient temperature T1 is not greater than a second preset temperature (such as 25° C.), the opening degree of the electronic expansion valve is adjusted after the electronic expansion valve operates at a second initial opening degree for a second predetermined period of time; and when the outdoor ambient temperature T1 is greater than the second preset temperature, the opening degree of the electronic expansion valve is adjusted after the electronic expansion valve operates at a third initial opening degree for a third predetermined period of time.

Specifically, the adjustment of the opening degree of the electronic expansion valve includes: obtaining the outdoor ambient temperature T1, and when the outdoor ambient temperature T1 is not greater than a first preset temperature, adjusting the opening degree of the electronic expansion valve according to a target opening degree of the electronic expansion valve, where for different outdoor ambient temperatures, the corresponding target opening degrees are different; and when the outdoor ambient temperature is greater than the first preset temperature, controlling the opening degree of the electronic expansion valve according to a second target exhaust gas temperature.

Through the above-mentioned approach, when the outdoor ambient temperature is less than a first preset temperature value, a resistance value of an exhaust gas temperature probe is influenced, which causes that a detected exhaust gas temperature is inaccurate; the application of the target opening degree to control the opening degree of the electronic expansion valve can ensure the control accuracy of the opening degree of the electronic expansion valve; and when the outdoor ambient temperature is greater than the first preset temperature, the operating load and state of a machine can be intuitively reflected by means of frequencies, thereby improving the control accuracy of the electronic expansion valve. According to different outdoor ambient temperatures, different control methods are adopted, which can take into account the advantages of target opening degree control and target exhaust gas temperature control, thereby improving the operation effect of the system.

Further, the target opening=$y*F+z$; the outdoor ambient temperature is less than $\alpha°$ C., $y=y1$, $z=z1$; the outdoor ambient temperature follows an equation $\alpha<T1\beta$, $y=y2$, $z=T4+z2$; the outdoor ambient temperature an equation $\beta<T1<\gamma$, $y=y3$, $z=T4+z3$; where $\alpha$, $\beta$, $\gamma$ are preset outdoor ambient temperature parameters, y1, y2, y3, z1, z2, z3 are coefficients respectively, and T4 is an outlet water temperature of the heat pump. Under different outdoor ambient temperature conditions, the corresponding target opening degrees are different, which improves the control accuracy of the electronic expansion valve.

Further, a second exhaust gas temperature T2 of the compressor and the outlet water temperature T4 of the heat pump are obtained, a second exhaust gas superheat degree SH2 is obtained according to a difference between T2 and T4, and the opening degree of the electronic expansion valve is corrected according to the second exhaust gas superheat degree and a specified superheat degree constant. The exhaust gas superheat degree is calculated according to a difference between the exhaust gas temperature and the outlet water temperature, and compared with a preset superheat degree value, which improves the control accuracy of the electronic expansion valve.

Figure 3:
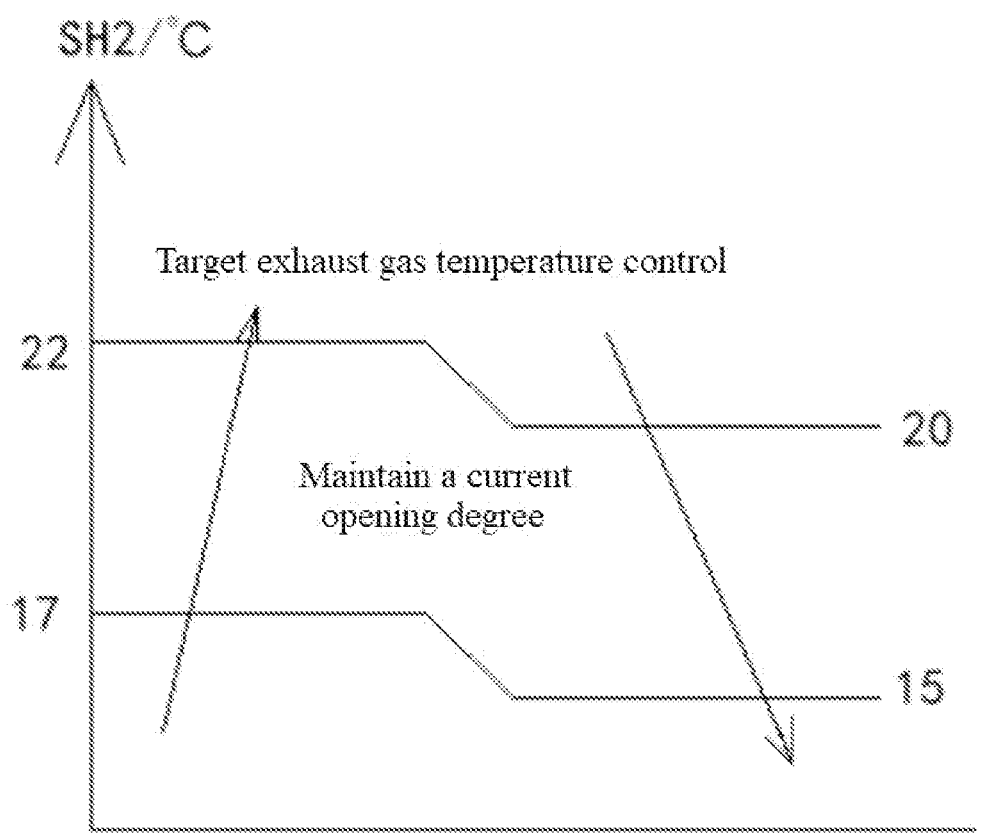
FIG. 3 is a line chart of adjusting an opening degree of an electronic expansion valve according to an exhaust gas superheat degree in a third embodiment of the present invention.

Specifically, as shown in FIG. 3, in the rising process of the second exhaust gas superheat degree, the opening degree of the electronic expansion valve is controlled to be reduced when the second exhaust gas superheat degree is less than a first preset value, the opening degree of the electronic expansion valve is maintained when the second exhaust gas superheat degree is less than a second preset value and greater than the first preset value, and the opening degree of the electronic expansion valve is controlled according to the target opening degree when the second exhaust gas superheat degree is greater than the second preset value; and in the falling process of the second exhaust gas superheat degree, the opening degree of the electronic expansion valve is controlled according to the target opening degree when the second exhaust gas superheat degree is greater than a third preset value, the opening degree of the electronic expansion valve is maintained when the second exhaust gas superheat degree is less than the third preset value and greater than a fourth preset value, and the opening degree of the electronic expansion valve is controlled to be reduced when the second exhaust gas superheat degree is less than the fourth preset value, where the fourth preset value, the first preset value, the third preset value and the second preset value are sequentially increased. By controlling the opening degree of the electronic expansion valve for different exhaust gas superheat degrees, the exhaust gas superheat degree can meet the superheat degree requirements. In the specific embodiment of the present invention, the fourth preset value, the first preset value, the third preset value and the second preset value are respectively 15, 17, 20, and 22. The superheat preset value can be adjusted by those skilled in the art according to the system, and is not limited to the examples of the present invention.

In a preferred embodiment of the present invention, the method further includes: obtaining a frequency of a compressor and an outlet water temperature T4 of the heat pump, and the second target exhaust gas temperature=a*F+b*T4+d+c, where: F is the frequency of the compressor; T4 is the outlet water temperature of the heat pump; a, b, and d are coefficients, respectively; and c: when F≤nHz, c=1; and when F>nHz, c=0, n is a constant, e.g., n=30 HZ.

Further, in a preferred embodiment of the present invention, the method further includes: the opening degree of the electronic expansion valve is adjusted according to a difference between an actual exhaust gas temperature and a target exhaust gas temperature, specifically, when the opening degree of the electronic expansion valve is controlled according to the second target exhaust temperature, the opening degree of the electronic expansion valve is corrected according to the difference between the actual exhaust gas temperature and the target exhaust gas temperature.

According to the present invention, in different modes, different control methods for an electronic expansion valve are adopted, which is beneficial to improving the control accuracy of the electronic expansion valve and meeting the superheat degree requirements, and is suitable for low temperature environments and low-frequency operation of the compressor, thereby improving the adaptability of the system to different conditions.

Fourth Embodiment

The fourth embodiment of the present invention provides an air source heat pump system, which implements the above-mentioned control method for an electronic expansion valve of an air source heat pump system, or includes the above-mentioned control device for an electronic expansion valve of an air source heat pump system.

The air source heat pump system of the present invention improves the accuracy of the opening degree control of the electronic expansion valve on the premise of meeting the superheat degree requirement, and is suitable for low temperature environments and the low-frequency operation of a compressor, thereby improving the adaptability of the system to different conditions, and ensuring the stable operation of the system.

The above are only preferred embodiments of the present invention and are not intended to limit the present invention. Any modifications, equivalent substitutions and improvements made within the spirit and principle of the present invention should be included within the scope of protection of the present invention.

What is claimed is:

1. A control method for an electronic expansion valve of an air source heat pump system, comprising:
obtaining a frequency of a compressor, calculating a target exhaust gas temperature according to the frequency of the compressor, and controlling an opening degree of the electronic expansion valve according to the target exhaust gas temperature; and
obtaining an exhaust gas superheat degree of the compressor, and correcting the opening degree of the electronic expansion valve according to a comparison result between the exhaust gas superheat degree and a preset superheat degree value, so that the exhaust gas superheat degree meets superheat degree requirements;
wherein in the rising process of the exhaust gas superheat degree, the opening degree of the electronic expansion valve is controlled to be reduced when the exhaust gas superheat degree is less than a first preset value, the opening degree of the electronic expansion valve is maintained when the exhaust gas superheat degree is less than a second preset value and greater than the first preset value, and the opening degree of the electronic expansion valve is controlled according to the target exhaust gas temperature when the exhaust gas superheat degree is greater than the second preset value; and
in the falling process of the exhaust gas superheat degree, the opening degree of the electronic expansion valve is controlled according to the target exhaust gas temperature when the exhaust gas superheat degree is greater than a third preset value, the opening degree of the electronic expansion valve is maintained when the exhaust gas superheat degree is less than the third preset value and greater than a fourth preset value, and the opening degree of the electronic expansion valve is controlled to be reduced when the exhaust gas superheat degree is less than the fourth preset value, where the fourth preset value, the first preset value, the third preset value and the second preset value are sequentially increased.

2. The control method for an electronic expansion valve of an air source heat pump system according to claim 1, wherein in a refrigeration mode, the frequency of the compressor and an outdoor ambient temperature are obtained, the target exhaust gas temperature is obtained according to the outdoor ambient temperature and the frequency of the compressor, and the target exhaust gas temperature=A*F+T1+B, where:
A is a coefficient;
F is the frequency of the compressor;
T1 is the outdoor ambient temperature; and
B is a constant.

3. The control method for an electronic expansion valve of an air source heat pump system according to claim 2, further comprising: in the refrigeration mode, obtaining an exhaust gas temperature T2 of the compressor and a coil temperature T3 of an outdoor unit, obtaining a first exhaust gas superheat degree according to a difference between T2 and T3, and correcting the opening degree of the electronic expansion valve according to a comparison result between the first exhaust gas superheat degree and the preset superheat degree value.

4. An air source heat pump system, wherein the system implements the control method for an electronic expansion valve of an air source heat pump system according to claim 1.

5. A control method for an electronic expansion valve of an air source heat pump system, comprising:
obtaining a frequency of a compressor, calculating a target exhaust gas temperature according to the frequency of the compressor, and controlling an opening degree of the electronic expansion valve according to the target exhaust gas temperature; and
obtaining an exhaust gas superheat degree of the compressor, and correcting the opening degree of the electronic expansion valve according to a comparison result between the exhaust gas superheat degree and a preset superheat degree value, so that the exhaust gas superheat degree meets superheat degree requirements;

wherein in a heating mode, an outdoor ambient temperature T1 is obtained, and the opening degree of the electronic expansion valve is adjusted according to a target opening degree of the electronic expansion valve when the outdoor ambient temperature T1 is not greater than a first preset temperature, where for different outdoor ambient temperatures, the corresponding target opening degrees are different; and when the outdoor ambient temperature is greater than the first preset temperature, the opening degree of the electronic expansion valve is controlled according to the target exhaust gas temperature.

6. The control method for an electronic expansion valve of an air source heat pump system according to claim 5, wherein the target opening degree=y*F+z;

the outdoor ambient temperature is less than $\alpha°$ C., y=y1, z=z1;

the outdoor ambient temperature follows an equation $\alpha<T1<\beta$, y=y2, z=T4+z2; and the outdoor ambient temperature follows an equation $\beta<T1<\gamma$, y=y3, z=T4+z3;

where $\alpha$, $\beta$ and $\gamma$ are preset outdoor ambient temperature parameters;

y1, y2, y3, z1, z2, z3 are coefficients respectively; and

T4 is an outlet water temperature of the heat pump.

7. The control method for an electronic expansion valve of an air source heat pump system according to claim 6, wherein in a rising process of the exhaust gas superheat degree, the opening degree of the electronic expansion valve is controlled to be reduced when the exhaust gas superheat degree is less than a first preset value, the opening degree of the electronic expansion valve is maintained when the exhaust gas superheat degree is less than a second preset value and greater than the first preset value, and the opening degree of the electronic expansion valve is controlled according to the target opening degree when the exhaust gas superheat degree is greater than the second preset value; and in a falling process of the exhaust gas superheat degree, the opening degree of the electronic expansion valve is controlled according to the target opening degree when the exhaust gas superheat degree is greater than a third preset value, the opening degree of the electronic expansion valve is maintained when the exhaust gas superheat degree is less than the third preset value and greater than a fourth preset value, and the opening degree of the electronic expansion valve is controlled to be reduced when the exhaust gas superheat degree is less than the fourth preset value, where the fourth preset value, the first preset value, the third preset value and the second preset value are sequentially increased.

8. The control method for an electronic expansion valve of an air source heat pump system according to claim 5, wherein the frequency of the compressor and an outlet water temperature T4 of the heat pump are obtained, and the target exhaust gas temperature=a*F+b*T4+d+c, where:

F is the frequency of the compressor;

T4 is the outlet water temperature of the heat pump;

a, b, and d are coefficients, respectively; and c: when F≤nHz, c=1; and when F>nHz, c=0, and n is a constant.

* * * * *